US012523633B2

(12) United States Patent
Thompson et al.

(10) Patent No.: US 12,523,633 B2
(45) Date of Patent: Jan. 13, 2026

(54) MAGNETIZERS FOR PIGGING TOOLS HAVING ROTATIONAL ELEMENTS

(71) Applicant: Novitech Inc., Vaughan (CA)

(72) Inventors: Ron Thompson, Vaughan (CA); Michael Yachnis, Vaughan (CA); Jaidan Barretto, Markham (CA)

(73) Assignee: NOVITECH INC., Vaughan (CA)

( * ) Notice: Subject to any disclaimer, the term of this patent is extended or adjusted under 35 U.S.C. 154(b) by 150 days.

(21) Appl. No.: 18/434,034

(22) Filed: Feb. 6, 2024

(65) Prior Publication Data

US 2025/0251365 A1   Aug. 7, 2025

(51) Int. Cl.
*G01N 27/87* (2006.01)
*F16L 55/28* (2006.01)
*F16L 101/30* (2006.01)

(52) U.S. Cl.
CPC .............. *G01N 27/87* (2013.01); *F16L 55/28* (2013.01); *F16L 2101/30* (2013.01)

(58) Field of Classification Search
CPC ....... G01N 27/87–9093; F16L 2101/30; F16L 55/26–48
USPC ........................................................ 324/238
See application file for complete search history.

(56) References Cited

U.S. PATENT DOCUMENTS

| | | |
|---|---|---|
| 3,460,028 A | 8/1969 | Beaver et al. |
| 3,483,466 A | 12/1969 | Beaver et al. |
| 3,483,734 A | 12/1969 | Wood |
| 3,496,457 A | 2/1970 | Proctor et al. |
| 3,529,236 A | 9/1970 | Proctor et al. |
| 3,899,734 A | 8/1975 | Beaver et al. |
| 3,949,292 A | 4/1976 | Beaver et al. |
| 3,967,194 A | 6/1976 | Beaver et al. |
| 4,105,972 A | 8/1978 | Smith |
| 4,310,796 A | 1/1982 | Braithwaite et al. |
| 4,447,777 A | 5/1984 | Sharp et al. |
| 5,454,276 A | 10/1995 | Wernicke |
| 5,864,232 A | 1/1999 | Laursen |
| 6,023,986 A | 2/2000 | Smith et al. |
| 6,165,144 A | 12/2000 | Talish et al. |

(Continued)

FOREIGN PATENT DOCUMENTS

| | | |
|---|---|---|
| CA | 2541740 | 5/1998 |
| CA | 2941509 | 12/2010 |
| CN | 201697891 U | 1/2011 |

OTHER PUBLICATIONS

International Search Report and Written Opinion issued in PCT Application No. PCT/IB2018/050330; dated Apr. 17, 2018; 13 pages.

*Primary Examiner* — Alesa Allgood
*Assistant Examiner* — Rahul Maini
(74) *Attorney, Agent, or Firm* — BakerHostetler

(57) ABSTRACT

Circumferential and axial magnetizers for a magnetic flux leakage pig. A magnet bar may comprise at least one magnet and may be configured to collapse radially inward to the shaft. Magnetizers may include a cushion disposed about the shaft and biasing the magnet bar against a pipe wall. A sensor head disposed between circuit poles at each polar end of the magnet monitors magnetic flux. The central shaft of a circumferential magnetizer or axial magnetizer may comprise a joint linking an additional smart pig module. One or more rotational elements may be disposed on the magnet bar.

30 Claims, 12 Drawing Sheets

(56) References Cited

U.S. PATENT DOCUMENTS

| | | |
|---|---|---|
| 6,196,075 B1 | 3/2001 | Comello et al. |
| 6,198,277 B1 | 3/2001 | Porter et al. |
| 6,538,431 B2 | 3/2003 | Couchman et al. |
| 6,640,655 B1 | 11/2003 | Manzak et al. |
| 6,762,602 B1 | 7/2004 | Laursen et al. |
| 6,847,207 B1 | 1/2005 | Veach et al. |
| 6,857,329 B2 | 2/2005 | Savard |
| 6,924,640 B2 | 8/2005 | Flickert et al. |
| 7,038,444 B2 | 5/2006 | Crouch et al. |
| 7,218,102 B2 | 5/2007 | Nestleroth et al. |
| 7,240,574 B2 | 7/2007 | Sapelnikov et al. |
| 7,402,999 B2 | 7/2008 | Plotnikov et al. |
| 7,458,289 B2 | 12/2008 | Houldey et al. |
| 7,548,059 B2 | 6/2009 | Thompson et al. |
| 7,595,636 B2 | 9/2009 | Barolak et al. |
| 7,859,256 B1 | 12/2010 | Hoyt et al. |
| 7,923,994 B2 | 4/2011 | Hoyt |
| 8,035,374 B1 | 10/2011 | Girrell et al. |
| 8,232,796 B2 * | 7/2012 | Laursen ................. G01N 27/82 |
| | | 324/219 |
| 8,653,811 B2 | 2/2014 | Simek et al. |
| 8,674,678 B2 | 3/2014 | Hwang et al. |
| 8,797,033 B1 | 8/2014 | Girrell et al. |
| 8,925,400 B2 | 1/2015 | Hill et al. |
| 9,442,126 B2 | 9/2016 | Laursen et al. |
| 9,625,418 B2 | 4/2017 | Laursen et al. |
| 9,728,817 B2 | 8/2017 | Comello et al. |
| 11,346,810 B2 | 5/2022 | Thompson et al. |
| 2009/0166035 A1 | 7/2009 | Almaguer |
| 2010/0327859 A1 | 12/2010 | Simek et al. |
| 2012/0176127 A1 | 7/2012 | Fussell et al. |
| 2012/0253696 A1 | 10/2012 | Pearson et al. |
| 2018/0106762 A1 | 4/2018 | Boenisch |
| 2018/0172638 A1 | 6/2018 | Banks et al. |
| 2022/0146455 A1 * | 5/2022 | Thompson ............. G01N 27/82 |

* cited by examiner

MAGNETIZERS FOR PIGGING TOOLS HAVING ROTATIONAL ELEMENTS

TECHNICAL FIELD

The present disclosure relates to apparatus and systems for inspecting pipelines. More specifically, the present disclosure relates to apparatus and systems for detecting structural defects, flaws, and other damage in pipeline systems and having one or more elements configured to reduce drag or friction forces that such apparatus and systems experience when traversing a pipeline.

BACKGROUND

The energy infrastructure of the world depends on pipelines. Pipelines transport crude oil and unrefined gas from wells to refineries and transport refined products to chemical plants, utilities, local distribution units, homes, airports, and nearly every place that uses energy. Energy pipelines include liquid petroleum pipelines and natural gas pipelines.

Pipelines can vary in size depending on purpose. For example, in oil-producing locations, gathering pipelines may be as small as two inches in diameter. The Trans-Alaska Pipeline, in contrast, which transports crude oil, is about 48 inches in diameter. Pipelines of varying sizes and purposes have diameters in between. Some pipelines have diameters that change along the length of pipeline.

Given the materials being transported, pipelines present health, safety, environmental, and security concerns. Pipeline and energy companies are economically incentivized to bring as much product as possible from source to destination. The various governments also regulate pipelines and pipeline-transported materials extensively. To prevent release of pipeline-transported materials, pipeline and energy companies conduct integrity management programs continuously.

Integrity management programs include inspections to determine the integrity of pipeline systems. To this end, inspections may identify early indications of future problems, such as corrosion, cracks, mechanical damage, and dent and bend strain locations that may have defects that can cause failures in the future. Pipeline inspection companies have developed specialized tools to inspect the full body of pipelines, including inline inspection tools commonly referred to as smart pigs.

Smart pigs travel through the interior of a pipeline, often without stopping the flow of medium through the pipeline. These pigs may collect gigabytes of data about a pipeline including wall thickness, geometrical shape, corrosion, pitting, cracks, holes, dents, and other potential sources of problems. Identifiable flaws include, but are not limited to, metal loss caused by corrosion, erosion, pipe manufacturing, and construction of pipelines. These flaws may include some forms of axially oriented flaws, such as narrow metal loss, hook cracks, lack of fusion, and fatigue-related cracking. These flaws may also include circumferentially oriented flaws of a similar nature. Mechanical damage may also be identified, including dents, gouges, cracks, and combined defects (e.g., a gouge near a pipe seam), and these types of damage may also be oriented either axially or circumferentially. Pigs use various, specialized sensing systems to automatically and continuously collect and store this data. The position of the pig at any moment in time is also recorded. Related software is typically used to interpret the data and aid operators in identifying significant flaws and their locations in order to investigate and make the necessary repairs to help prevent failures or mitigate failures from worsening.

Pigs used for in-line inspection of pipelines may employ one or more of several technologies, including but are not limited to ultrasonic technology ("UT") for wall thickness measurements or crack detection, electromagnetic acoustic transducer ("EMAT") technology, magnetic flux leakage ("MFL") technology, pipe surface profiling commonly referred to as geometry or caliper technology, and inertial mapping of pipe locations and detection of ground movement ("IMU"). MFL is a nondestructive method of testing that employs a magnetic flux leakage principle to detect certain defects and potential problems found in the full body of a pipeline. MFL can be used in pipelines made of ferromagnetic metals such as steel. Powerful magnets, including permanent or electromagnets, magnetize portions of the pipeline, and sensors may be placed between the poles of the magnets to monitor the changes in flux leakage from the pipeline in areas experiencing various flaws where the cross-sectional area is reduced by metal loss or where a fissure or crack perpendicular to the direction of the magnetic field causes a detectable change in the magnetic leakage field. Automated feature searches and human analysis can provide comprehensive reporting, prioritizing, and quantifying the severity of flaws. This information is then used by the pipeline operators to facilitate field investigations, repairs, and future inspection intervals.

Pigging tools may be propelled by the fluid (e.g., gas, crude oil, or other material generally in a gaseous or liquid state). Components known as drive cups, which are generally made from a compressible material like silicone, a urethane, or other thermoplastic, maintain a circumferential seal about the inner diameter of the pipeline. Fluids being transported through the pipeline build up behind the drive cup, creating a pressure differential that is used to propel the pigging tool forward.

However, there are difficulties and drawbacks with pigging tools that have yet to be solved and still other areas where pigging tools and systems can be improved.

In certain instances, drag and frictional forces can cause pigging tools to travel irregularly through a pipeline. Varying and inconsistent speeds can lead to issues in gathering and interpreting data. In multi-module tools, one part of the tool (e.g., a forward section) may experience a short but significant increase or decrease in speed relative to other parts of the tool (e.g., an aft section). This can alter the data and compromise its fidelity. Numerous causes can cause the tool or part thereof to experience an increase or decrease in drag or frictional forces, including an aberration in the pipe wall, a bend (or turn) in the pipeline, or a change in the fluid pressure propelling the pigging tool.

Additionally, some pigging tools can become temporarily stuck when encountering pipeline features such as tight bends. In certain types of pipelines, including natural gas pipelines, pressure may build up behind the pigging tool and propel the tool greatly. A velocity increase of a factor of ten may increase the forces and strain on linkages in the tool by a factor of 100. Such speed excursions can impart forces of about ten times the breaking force on linkage components connecting modules of a smart pig.

As used herein, "pig" and "pigging tool" may be used interchangeably to refer to a pipeline inspection tool.

SUMMARY

The present disclosure relates to pigs utilizing magnetic flux leakage technology. An embodiment of the present disclosure relates to MFL pigs having one or more circumferential magnetizers. Another embodiment of the present disclosure relates to MFL pigs having one or more axial magnetizers. Yet another embodiment of the present disclosure relates to MFL pigs having at least one of a circumferential magnetizer and at least one of an axial magnetizer.

A pig may be approximately cylindrical in shape and sized to fit the diameter(s) of the pipeline being inspected. A pig may include one or more component bodies. Where a pig includes two or more component bodies, the component bodies may be operatively connected. For example, an MFL pig may include three or more component bodies operatively connected to each other, two or more of the component bodies including magnetizers comprising magnets and sensors, and another component body including batteries, data storage, and various electronics. In some embodiments, a pig may include more than three component bodies. For example, a pig may include three circumferential magnetizers, an axial magnetizer, an electronics body, a geometry body, an IMU body, and a battery body. In an embodiment, the axial or circumferential magnetizers may be offset from each other to provide complete circumferential sensor coverage of the pipe.

A magnetizer on an MFL pig may use permanent magnets or electromagnets. In an embodiment, a magnetizer may use rare-earth magnets, for example neodymium-based magnets. Rare-earth magnets, such as neodymium-based magnets, may be plated with a metal layer. For example, neodymium-based magnets may be plated with a thin nickel layer.

In an embodiment, each magnetizer module may be arranged with four or more magnet bars. In an embodiment, each magnetizer module may be arranged with six magnet bars. Each magnet bar may provide a localized circuit to bring the magnetic flux density in the pipe wall to near saturation levels. For example, the flux density in the pipe wall may be brought equal to or greater than 1.6 Tesla. One of skill in the art will recognize that the number, type, and location of the magnets or magnet bars may be altered in various ways and still achieve saturation, for example, a magnetic flux density of about 1.6 Tesla.

Each of the magnet bars may be attached to a center shaft extending about a central axis of the magnetizer. The magnet bars may extend radially outward from the central shaft, which may have an axis coextensive with the direction of the pipeline. A circumferential magnetizer may create a magnetic field orientation in a direction transverse to the axis of a pipeline. An axial magnetizer may create a magnetic field orientation in a direction corresponding to the axis of a pipeline.

Aspects of the present disclosure relate to magnetizer modules of an MFL pig that have drag or friction reducing features. Other aspects of the present disclosure relate to magnetizer modules of an MFL pig having rotational elements, such as wheels, installed on and within the magnetizer modules, such as on or in the manet bars (or "mag bars"), to reduce the forces on the pigging tool or the magnetizer module imparted by friction and/or drag.

What is needed is a component, process, or alteration that could reduce drag forces experienced by a pigging tool in transit through a pipeline. Reducing drag in such a way could also provide for a smoother, more controlled velocity of the pigging tool, resulting in an improved running profile. In other words, maintaining a steadier speed may yield more consistent, more reliable data measurements. Maintaining a smooth, steady velocity may also help keep the pigging tool and its various modules in alignment, which may further improve data collection and data fidelity.

Reducing drag and/or friction forces experienced by a pigging tool could also reduce or eliminate unexpected stoppages when the wall thickness of a pipeline changes (either by design or due to metal loss, corrosion, precipitation, or deposition.

Reducing drag and/or friction forces experienced by a pigging tool could also reduce or eliminate unexpected stoppages at bends, valves, and other pipeline features.

A pigging tool unexpectedly stopping, such as from becoming stuck, is a major issue in the pipeline inspection and pigging arts. A stopped or stuck pigging tool is not collecting data. Further, a pig that becomes stuck may place the pigging tool, or its component modules, out of alignment. Additionally, when a pigging tool becomes stopped or stuck, pressure from the pipeline product or medium builds up behind the pigging tool, increasing the pressure differential forward and aft of the tool significantly, and well beyond that needed to propel the tool through the pipeline and collect data. Eventually, the pressure will overcome the forces holding the pigging tool and will shoot the tool past the obstruction or bend. The tool will be shot at a very great velocity, which will generally preclude the ability to gather accurate data. Moreover, such sudden changes in velocity can cause significant strain on the tool or module linkages. This can damage the tool.

A component, process, or alteration that could reduce the drag or friction forces experienced by a pigging tool could also significantly reduce the wear experienced by pipeline-contacting components (or pipeline-adjacent components) of a pigging tool, such as magnet bars (or "mag bars") on MFL modules, or wear pads (such as carbide, ceramic, composite, or other types of wear pads) that may be installed on the pigging tool.

In aspects according to the present disclosure, a magnetizer module incorporates one or more rotational elements on or in (or partially within) the magnetizer module. In one embodiment, the one or more rotational elements comprise one or more wheels. In an embodiment, the one or more wheels can be circular or cylindrical. In one embodiment, the one or more wheels have a circular cross-section. In an embodiment, the one or more rotational elements may be retained on one or more axles (or shafts comprising bearings allowing for rotation). In an embodiment, the one or more rotational elements comprise one or more spherical balls retained in a bearing.

It would be further beneficial that a component, process, or alteration to a pigging tool be easy to repair or replace when it becomes worn out, including in the field by a technician, preferably in a matter of a few minutes, so as not to impede pipeline inspection operations. In an embodiment comprising one or more rotational elements on, in, or partially within a magnetizer module or a mag bar thereof, it would be beneficial for such rotational elements to be easily and quickly accessible, detachable, cleanable, and/or replaceable in the field.

It would also be beneficial for a component, process, or alteration to a pigging tool to impart a slight amount of rotation to a pigging tool or module thereof. In an embodiment where a magnetizer module or a mag bar comprises one or more rotational elements, such as one or more wheels, it would be beneficial to configure said rotational elements to have a small amount of offset relative to the axis of the pipeline (e.g., so that the axis of rotation of said rotational elements is offset slightly from perpendicular to the axis of the pipeline). In one aspect, the one or more rotational elements may be offset approximately 0.4 degrees to about 8 degrees. In a preferred embodiment, the one or more rotational elements may be offset but by less than about 5 degrees. In one aspect, the one or more rotational elements may be offset by about 1 degrees to about 4 degrees. In another aspect, the one or more rotational elements may be offset by about 1.5 degrees to about 3 degrees. In a preferred aspect, the one or more rotational elements may be offset by about 2 degrees. In smaller tools (such as pigs less than six inches in diameter), the one or more rotational elements may not be offset at all. In larger diameter tools, which generally are heavier, a relatively larger amount of offset in the one or more rotational elements may be preferred compared to smaller diameter tools to maintain a relatively constant degree of rotation. In one aspect according to the present disclosure, a 2 degree offset may impart about 360 degrees of rotation about every 100 to 200 meters. In an aspect, a degree of offset may be identified and chosen to impart about 360 degrees of rotation every 100 to 200 meters.

In an embodiment where a magnetizer module or a mag bar comprises one or more rotational elements, such as one or more wheels, the one or more rotational elements may be offset from perpendicular to the axis of the pipeline in a counterclockwise direction. In an embodiment, one or more rotational elements may be configured to have an offset large enough to impart a consistent rotation to the magnetizer module or smart pig but not so large as to cause the magnetizer module or smart pig to rotate too quickly and jeopardize complete coverage of a pipeline wall, such as through the corkscrew effect.

In one aspect according to the present disclosure, a slight, imparted rotation to a pigging tool may ensure an even rate of wear on all like components making contact with, or positioned adjacent to, the pipeline wall.

In one aspect according to the present disclosure, a slight, imparted rotation to a pigging tool may add precision to an inertial navigation device. Inertial navigation devices may include one or more accelerometers and one or more gyroscopic sensors.

Accelerometers may deliver data regarding speed and direction of acceleration by, for example, measuring linear acceleration of the device relative to itself. Gyroscopic sensors may provide or measure orientation and may measure angular velocity. Measuring angular velocity with linear acceleration may provide accurate information for all position changes of the moving inertial navigation device. Assuring a slight rotation may increase the accuracy of gyroscopic sensors.

In one aspect according to the present disclosure, a slight, imparted rotation to a pigging tool may ensure more precise sensor scanning of the pipeline wall, including long seams and other flaws. As one example, a slight, imparted rotation may allow for a smoother profile of very small features (including axial flaws like cracking, pin holes, narrow axial corrosion, and selective seam weld corrosion). Rotation allows multiple sensors to pass across features, particularly axial features, as opposed to merely one or a couple of sensors passing over a flaw.

It one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In turn, a reduction in drag or friction forces experienced by the tool may lower the differential pressure required to propel the pigging tool through the pipeline. A pigging tool that is propelled through a pipeline with a lower differential pressure means that the drive cups handle a reduced load. A reduced load on the drive cups may reduce the wear on the drive cups and may thereby extend the life of the drive cups.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In turn, lower forces may act on the linkages between modules of the pigging tool, which may reduce the risk of linkage fatigue and failure, thereby increasing safety and extending the life of pigging tools. Reduced drag or friction forces may result in a pigging tool becoming stuck less frequently and, if it occurs, less severely. In other words, a stuck tool may be freed with less pressure buildup behind the tool. In turn, sudden and severe velocity increases and attendant strain on linkage components can be dramatically reduced.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In an embodiment, a pigging tool incorporating such elements may more easily be able to pass pipeline aberrations, damaged areas, or bends, which may mean that the pigging tool does not become stuck or temporarily stopped, which means that there will be less frequent sudden increases in velocity from a pressure differential building and causing the tool to suddenly become freed. This may lead to a lessened risk of pigging tool damage and pipeline damage.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In an embodiment, a pigging tool incorporating such elements may collect improved data quality and fidelity and lower data degradation due to a smoother and more controlled velocity.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In one embodiment, including one or more rotational elements on one or more magnetizer modules may enable about a 4.5 times reduction in drag force.

In an embodiment where a magnetizer module or a mag bar comprises one or more rotational elements, such as one or more wheels, a mag bar may contain between two rotational elements and eight rotational elements. In an embodiment, a mag bar may contain four rotational elements.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope. The disclosure will be described with additional specificity and detail through use of the accompanying drawings.

In the drawings.

DETAILED DESCRIPTION

Figure 1:
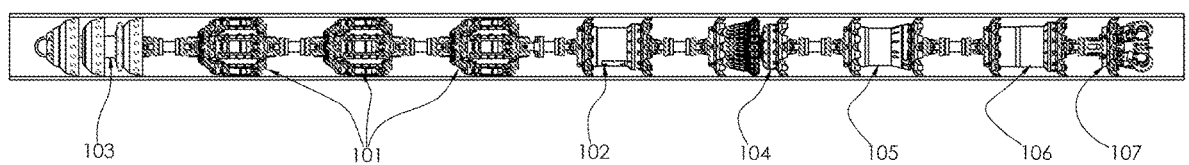
FIG. 1 depicts an MFL pig having a plurality of operatively connected component bodies in accordance with an embodiment of the present disclosure.

In the following detailed description, reference is made to the accompanying drawings, which form a part hereof. In the drawings, similar symbols typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to apparatus and systems for inspecting pipelines. Examples of this disclosure may be drawn to pigs and pigging systems, smart pigs, MFL pigs, circumferential magnetizers for MFL pigs, and axial magnetizers for MFL pigs. Particular examples may be directed to certain aspects and components of magnetizers for MFL pigs, including apparatus or alterations for reducing drag forces or frictional forces experienced by a magnetizer or pigging tool during transit through a pipeline. Additional examples may be directed to magnet bars on MFL magnetizers containing rotational elements, which may have the effect of reducing drag forces or frictional forces experienced by a magnetizer or pigging tool during transit through a pipeline. Additional examples may include rotational elements incorporated on or within (or partially within) one or more magnet bars, where the rotational elements are one or more wheels, one or more ball bearings, or both. In further examples, the one or more rotational elements may be offset from an orientation perpendicular from the axis of a pipeline. In still further examples, the one or more rotational elements may be offset from an orientation perpendicular from the axis of a pipeline, with the amount of offset being between about 0.4 degrees and about 5 degrees, and preferably about 2 degrees.

With reference to FIG. 1, an exemplary embodiment of an MFL pig including circumferential magnetizers is shown. The MFL pig may include several component bodies, including circumferential magnetizers 101, integrated electronic component body 102, and drive section component body 103. Each of circumferential magnetizers 101 may be offset from the other in order to ensure that the entire pipe surface to be inspected is covered by the magnetic circuits and sensors. A geometry module 104 may include mechanical arms for measuring deformations and the internal diameter of the pipeline. An additional module 105 may include an inertial measurement unit for continuous mapping of the pipeline. One or more battery modules 106 may be used to power all systems related to the inspection tool. A rear assembly module 107 may contain a transmitter and odometer. As will be appreciated by one of skill in the art, various other sensors and electronic components may be included on an MFL pig depending on the purpose of the pig and the intended measurements.

Figure 2:
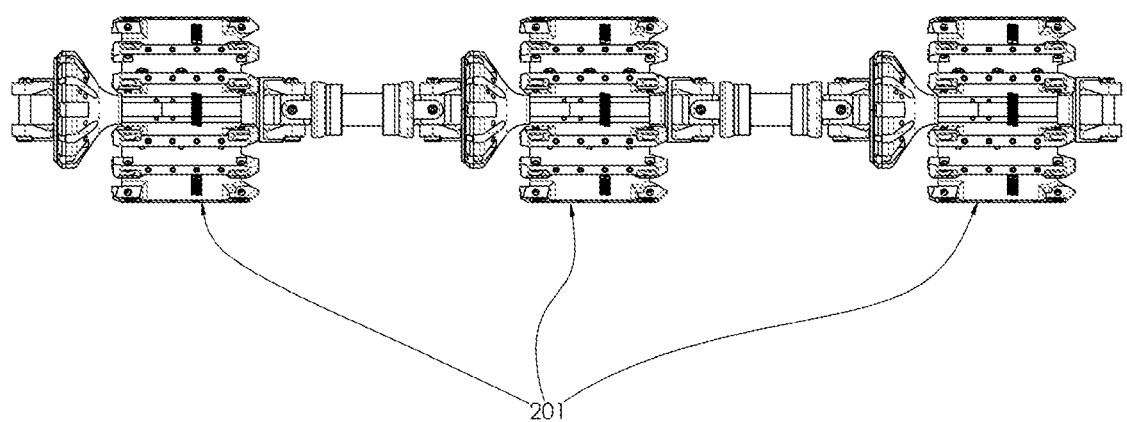
FIG. 2 presents a side view of a portion of an MFL pig having a plurality of operatively connected component bodies in accordance with an embodiment of the present disclosure.

FIG. 2 presents a detailed view of the exemplary embodiment of the MFL pig shown in FIG. 1. The portion of the MFL pig shown in the embodiment of FIG. 2 includes three circumferential magnetizer modules 101. One of skill in the art will appreciate that the component bodies shown need not be in the particular order presented in the figure. The modular structure of the component bodies may also enable easy repair of the pig by allowing a technician to swap out a component body in need of repair, thus allowing the pig to remain in service more continuously.

A circumferential magnetizer 101 in accordance with the present disclosure may include several components, including magnet systems, sensor systems, sensor suspension systems, magnet bar wear pads, and other related components. A circumferential magnetizer in accordance with the present disclosure may include one or more magnets oriented and configured to induce a magnetic field transverse to the axis of the pipeline. In an embodiment, a magnetizer may include a plurality of banks of magnets disposed circumferentially around a central shaft of a magnetizer. In an embodiment, sensors may be disposed between the banks of magnets. In an aspect of the present disclosure, one or more magnet bars may include one or more rotational elements disposed on, in, or partially within the magnet bar(s). In an aspect according to the present disclosure, one or more rotational elements, such as wheel(s) or bearing(s), may reduce the drag force or friction force experienced by the magnetizer. In an embodiment, a pigging tool incorporating such rotational elements may collect improved data quality and fidelity and lower data degradation due to a smoother, more consistent, and more controlled velocity.

As described above, a circumferential magnetizer may include a plurality of magnets or a plurality of banks of magnets. The magnets, together with the magnetic circuit poles, may form magnet bars. The magnet bars may be spaced evenly apart from each other and may extend radially outward from the central shaft, the central shaft being coaxial with the length of the pipeline. For example, a circumferential magnetizer may include two or more magnet bars, each magnet bar having a pair of magnetic circuit poles with the sensors disposed between the magnetic circuit poles. The sensor head may include a plurality of sensors. The magnet bars may include a plurality of magnets, each magnet being aligned in the same polarity. A magnetic circuit pole may contact one pole of a magnet and extend from the magnet radially outward toward a pipe wall. Another magnetic circuit pole may contact the opposite pole of the magnet and extend from the magnet radially outward toward the pipe wall. A sensor head may be disposed between these magnetic circuit poles. In this manner, a magnetic field may flow between the magnetic circuit poles and across the sensor head disposed between the magnet bars. When the magnetic circuit poles contact the pipe wall, a magnetic circuit may be created, and the sensors on the sensor head may monitor the magnetic flux and detect any magnetic flux leakage from the pipe wall.

In an embodiment, a circumferential magnetizer may include two or more magnet bars, each including one or more magnets. In an embodiment, each magnet bar may include a plurality of magnets, each magnet having the same orientation. Each magnet may include a first side having a first polarity and a second side having a polarity opposite to the first polarity. A first magnetic circuit pole may extend radially outward from the side of a magnet having a first polarity toward the pipe wall, and a second magnetic circuit pole may extend radially outward from the side of a magnet having the opposite polarity toward the pipe wall. Magnetic circuit poles may comprise the poles of the magnets themselves, or may comprise a magnetic material magnetically coupling the poles of the magnets to a pipe wall when brought into close proximity or contact. Positioning magnets and magnetic circuit poles in this manner allows a magnetizer to impart a magnetic field circumferentially around the interior of a pipeline in an orientation transverse to the axis of the pipeline. This orientation may allow for axially oriented defects, such as a narrow axial metal loss or corrosion, loci of damage, some forms of axial cracking, or longitudinal seam weld defects extending axially down a portion of the pipeline to be detected.

The magnets in a circumferential magnetizer may be permanent magnets or electromagnetic magnets. In an embodiment, the magnets may be rare-earth permanent magnets. In an embodiment, the magnets may be neodymium-based magnets.

Each magnetic circuit pole may include one or more wear pads. A magnetic circuit pole wear pad may protect a magnetic circuit pole from the interior surface of the pipeline or debris within the pipeline interior. This may extend the amount of usable time between repairs. In an embodiment, a magnetic circuit pole wear pad may comprise one or more inserts. In a detailed embodiment, the magnetic circuit pole wear pad may comprise a plurality of carbide or ceramic inserts. In an embodiment, one or more magnetic circuit poles may include one or more carbide or ceramic inserts disposed directly into the magnetic circuit pole(s). Carbide or ceramic inserts may provide beneficial reductions in drag force. Carbide or ceramic inserts may reduce drag force by as much as 30% from conventional designs. Each magnetic circuit pole wear pad, if included, may be maintained at an angle with respect to the axis of the pipeline. A magnet bar wear pad, in an embodiment, may be arranged and designed to facilitate slow counter-clockwise rotation of a magnetizer or pig. Alternatively or in addition, the carbide or ceramic inserts, if included, may be disposed in a pattern designed to facilitate a slow rotation of the pig.

One or more sensor heads may be placed in each magnet bar. The one or more sensor heads may be disposed between magnetic circuit poles and may therefore be positioned to measure magnetic flux through a pipe wall. Each sensor head may include one or more sensors. The magnets may saturate a portion of pipeline to be inspected with a circumferential magnetic field. The sensors may measure the magnetic field and, in particular, may detect changes or aberrations in the magnetic field. Defects in the pipeline, including corroded areas, areas missing metal, geometric deformations, dents, buckles, wrinkles, cracks, and the like may induce aberrations and changes into the magnetic field, or the magnetic field may leak at the particular location of a defect.

Optionally or additionally, one or more magnet bars may include one or more rotational elements disposed on, in, or partially within the magnet bar(s), which may have the effect of reducing drag forces or frictional forces experienced by a magnetizer or pigging tool during transit through a pipeline. In an example, the rotational elements are one or more wheels. In another example, the rotational elements are one or more ball bearings. In another example, the rotational elements are a combination of wheels and ball bearings. Where the one or more rotational elements comprise wheels, the wheels may be offset from an orientation perpendicular from the axis of a pipeline. Where an offset is included, the offset may be between about 0.4 degrees to about 8 degrees. On most tools, it may be preferable for wheels to have an offset of less than about 5 degrees so as to not over-rotate the magnetizer and/or pigging tool. Larger diameter tools may be able to be configured such that the rotational elements have an offset greater than 5 degrees. In one aspect, the one or more wheels may be offset by about 1 degrees to about 4 degrees. In another aspect, the one or more wheels may be offset by about 1.5 degrees to about 3 degrees. In another aspect, the one or more rotational elements may be offset by about 2 degrees. In one aspect according to the present disclosure, a 2 degree offset may impart about 360 degrees of rotation about every 100 to 200 meters. In an aspect, a degree of offset may be identified and chosen to impart about 360 degrees of rotation every 100 to 200 meters.

Figure 3:
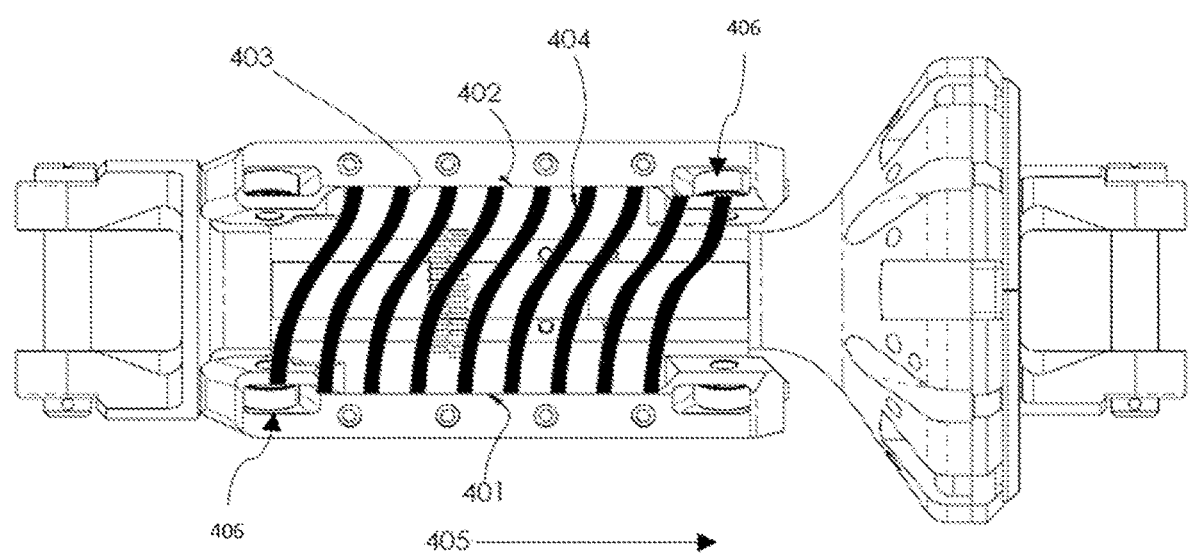
FIG. 3 depicts a schematic diagram of a magnet bar and shows the direction of the magnetic field in relation to the sensors and a crack-like defect, in accordance with an embodiment of the present disclosure.

For example, FIG. 3 depicts a single magnet bar. Each magnet bar may include magnets having a first polarity 401 (e.g., a south pole) and a second polarity 402 (e.g., a north pole) opposite to the first polarity 401. Note that the nomenclature and particular polarity assigned for the purposes of the written description is largely arbitrary; for example, north could be called positive, and south could be called negative. A south magnetic circuit pole 401 may couple the south pole side of the magnets to the pipe wall, and a north magnetic circuit pole 402 may couple the north pole side of the magnets to the pipe wall. Further, it is important that a sensor head be flanked on either side by magnetic circuit poles of opposing polarities to establish a magnetic field extending over and through the sensor head and sensors; this will be explained in further detail later. A magnet bar may include one or more rotational elements 406. Rotational elements 406 may be disposed on, in, or partially within the magnet bar. In certain examples, rotational elements 406 may be configured to extend about 2 millimeters outward from the surface of the magnet bar. In other examples, most of rotational elements 406 may be disposed in a space in the magnet bar configured to hold and maintain rotational elements 406 such that a small portion of rotational elements 406, for example, about 2 millimeters, extends outward past the surface of the magnet bar.

The circumferential magnetizers may travel through a pipe having an internal diameter less than the nominal diameter of the magnetizer and may be configured to closely articulate with the pipe wall. A pipe may have some structural aberration, such as a crack or crack-like anomaly. The magnetic field from the magnets may be imparted to the pipe wall by south magnetic circuit pole 401 and north magnetic circuit pole 402. For visualization and descriptive purposes, magnetic flux lines 403 are superimposed onto the diagram. Sensors may be placed between magnets to be within the magnetic field. The magnetic field may be disrupted when the circumferential magnetizer passes over an aberration, and the disruption in the magnetic field may be detected by the sensors. Arrow 405 represents a direction of travel through a pipe.

Figure 4:
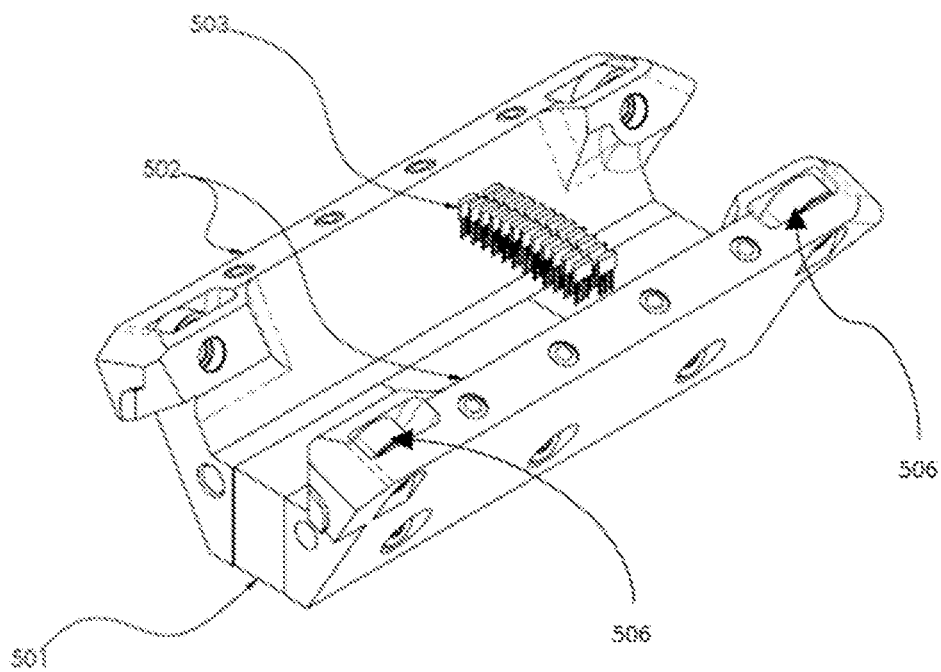
FIG. 4 presents an illustration of sensor placement relative to magnet and magnet bar placement on a circumferential magnetizer in accordance with an embodiment of the present disclosure.

In an embodiment, a magnet bar may include a plurality of sensors between each magnetic circuit pole to measure the magnetic flux imparted into the pipe. FIG. 4 generally illustrates the placement of sensors relative to the magnets. FIG. 4 shows a circumferential magnetizer having magnets 501, magnetic circuit poles 502, and sensors 503. Sensors 503 may be positioned between magnetic circuit poles 502. Magnetic circuit poles 502 may impart a magnetic flux into a pipe wall, and the magnetic flux may flow from one magnetic circuit pole to the other. Sensors 503 positioned within the magnetic field may take measurements of the magnetic flux. Rotational elements 506 such as wheels or ball bearings may be disposed partially within the magnet bar. In one aspect, rotational elements 506 (or a portion thereof) extend about 2 millimeters beyond a surface of magnetic circuit poles 502. In another aspect, rotational elements 506 (or a portion thereof) extend about 3 millimeters beyond a surface of magnetic circuit poles 502. In another aspect, rotational elements 506 (or a portion thereof) extend about 1 millimeter beyond a surface of magnetic circuit poles 502.

A circumferential magnetizer may be sized to have a nominal diameter slightly larger than the diameter of a pipe. For example, a circumferential magnetizer slightly larger than six inches in diameter may be configured to travel through a six-inch pipe. One of skill in the art will recognize that a circumferential magnetizer according to the present disclosure may be sized to inspect pipes of alternate and/or changing diameters.

Figure 5:
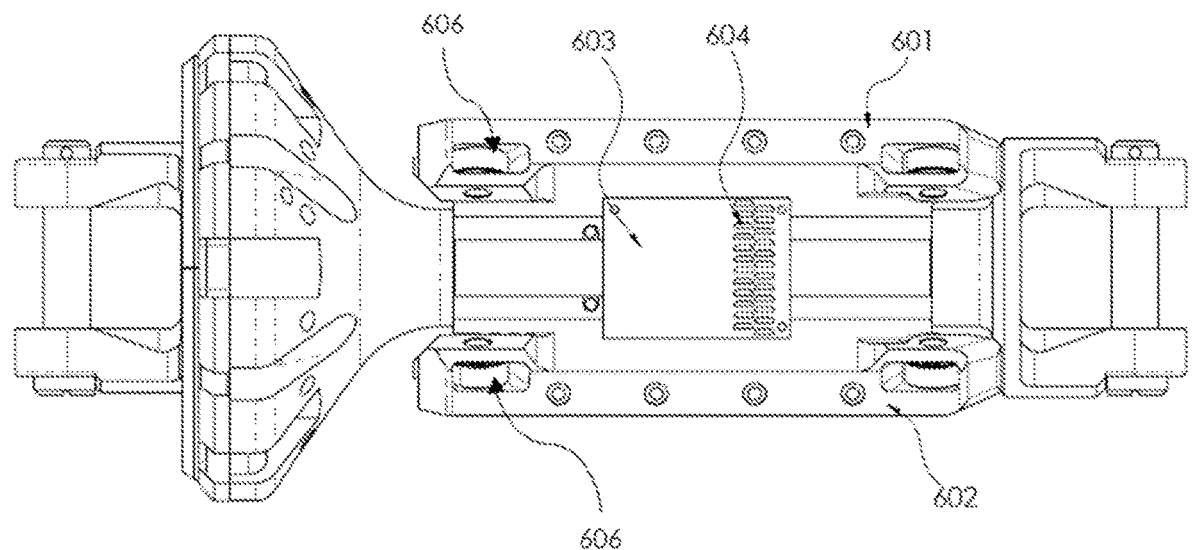
FIG. 5 shows a top view of a circumferential magnet bar in accordance with an embodiment of the present disclosure.

FIG. 5 shows a top view of a magnet bar of a circumferential magnetizer in accordance with an embodiment of the present disclosure. In the embodiment shown in FIG. 5, a circumferential magnetizer may include a north magnetic circuit pole 601 extending from a north-polarity side of one or more magnets and a south magnetic circuit pole 602 extending from a south-polarity side of one or more magnets. A magnet bar may include one or more rotational elements 606. When north magnetic circuit pole 601 and south magnetic circuit pole 602 contact a pipe wall, a magnetic flux may extend between magnetic circuit poles 601, 602. Sensor head 603 may be disposed between magnetic circuit poles 601, 602. Sensor head 603 may include one or more sensors 604. In an embodiment, sensors 604 may be Hall-effect sensors. In an embodiment, there may be 24 sensors 604 disposed on sensor head 603. In an embodiment, the magnet bar of FIG. 5 may include one or more magnets. In an embodiment, each magnet bar may include one or more rotational elements 606, which may be wheels.

Magnetic circuit poles 601, 602 may contact the interior of the pipeline. In an embodiment, magnetic circuit poles 601, 602 may function as a flux coupler to more efficiently saturate a pipe wall with a magnetic field. In a detailed embodiment, magnetic circuit poles 601, 602 may include wear pads 605 on at least a portion of a surface that contacts the pipe wall. Wear pads 605 may comprise one or more ceramic or carbide inserts, as depicted in FIG. 5. Ceramic or carbide inserts may protect the magnetic circuit poles from wear and may reduce drag force. In an embodiment, ceramic or carbide inserts may reduce drag force by about 30%. In an embodiment, one or more rotational elements 606 may be included partially within a magnetic circuit pole, and the one or more rotational elements 606 may impart a 4.5 times reduction in drag forces or frictional forces. Reducing drag or frictional forces may help to prevent a pig from stalling when navigating a relatively tight bend, which in turn may mitigate or eliminate sudden velocity increases due to pressure build-up behind a stalled pig, which may reduce damage to the pigging tool.

Figure 6:
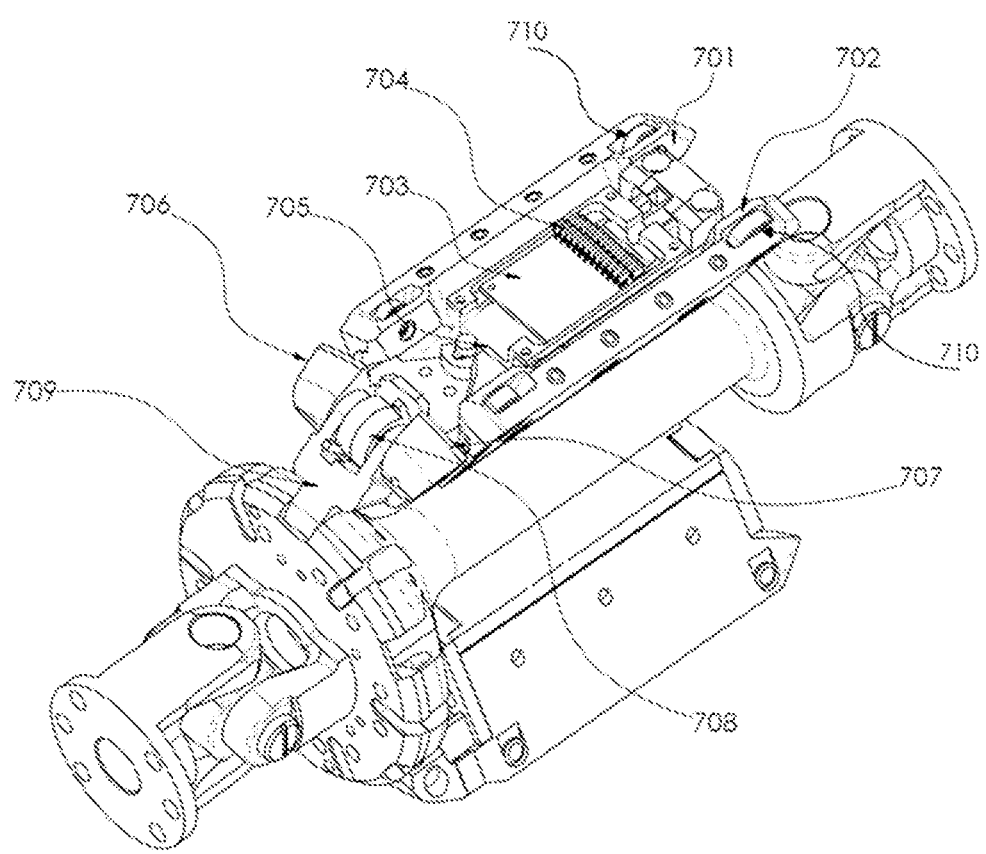
FIG. 6 depicts a perspective view of a circumferential magnetizer in accordance with an embodiment of the present disclosure.

FIG. 6 depicts a perspective view of a circumferential magnetizer in accordance with an embodiment of the present disclosure. In the embodiment shown in FIG. 6, a circumferential magnetizer may include north magnetic circuit pole 701 extending from a north-polarity side of one or more magnets, south magnetic circuit pole 702 extending from a south-polarity side of one or more magnets, sensor head 703, and a plurality of sensors 704 disposed on sensor head 703. In an embodiment, sensors 704 may be Hall-effect sensors, and there may be 24 sensors 704 disposed on sensor head 703. A sensor head wear pad 705 may be coupled to sensor head 703. Sensor head wear pad 705 may articulate with the pipe and may function to protect sensors 704. A magnetic circuit pole 701, 702 may include one or more rotational elements 710.

Sensor head wear pad 705 may comprise a nickel-based alloy or superalloy. Magnetic circuit poles 701, 702 may include a ceramic insert or coating. In detailed embodiments, the ceramic may comprise silicon carbide. In alternate detailed embodiments, the inserts may comprise tungsten carbide. In an embodiment, one or more rotational elements 710 may be included partially within a magnetic circuit pole 701, 702, and the one or more rotational elements 710 may impart a 4.5 times reduction in drag forces or frictional forces.

The circumferential magnetizer according to the embodiment depicted in FIG. 6 may include a means for collapsing 706 magnetic circuit poles 701, 702. Means for collapsing 706 may comprise front links 707, upper link 709, and torsion spring 708. Means for collapsing 706 may exert a sufficient force, such as a spring force, to maintain the magnetic circuit poles 701, 702 in engagement with the pipe wall but may collapse, entirely or partially, if the magnetic circuit poles 701, 702 encounter an aberration in the pipe, such as an indentation, or if the pig including the circumferential magnetizer encounters a bend in the pipe. In an embodiment, sensor head 703 is also operatively coupled to the means for collapsing 706.

In an embodiment, a magnetizer may include a polyurethane cushion disposed between a central shaft and one or more magnet bars. In one aspect, a polyurethane cushion may be annular and may be disposed circumferentially about the central shaft. In another aspect, multiple polyurethane cushions may be disposed about one or more circumferential portions of the central shaft. In one aspect, the one or more polyurethane cushions may be disposed at one axial end of a magnet bar. In another aspect, the more or more polyurethane cushions may be disposed circumferentially about the central shaft at each axial end of a magnet bar. In an embodiment, a magnetizer having a polyurethane cushion might not have a torsion spring 708; rather, a magnetizer may comprise front links 707, upper link 709, and the polyurethane cushion. The magnetizer cushion may provide a force sufficient to bias one or more magnet bars toward a pipe wall. The magnetizer cushion may be constructed or configured to have a pre-determined hardness and collapsibility. In an embodiment, a magnetizer cushion (e.g., a magnetizer cushion made from polyurethane) may have a Shore durometer of from about 70 A to about 90 A. In another embodiment, a magnetizer cushion may have a Shore durometer of from about 75 A to about 85 A.

A magnetizer cushion (e.g., a polyurethane cushion) may present a number of advantages for biasing one or more magnet bars against a pipe wall compared to a spring (e.g., a steel torsion spring). First, a magnetizer cushion (e.g., a polyurethane cushion) may provide a force on the magnet bar that biases the magnet bar against the pipe wall, but the magnitude of force provided by the magnetizer cushion may be substantially less than the force imparted to the magnet bar by a spring (e.g., a near neutral force). In an embodiment, a magnetizer cushion may impart a force on a magnet bar from about 20% to about 30% less than the force that would be applied by a steel spring. With a lesser force, the drag experienced by a magnetizer or a pig incorporating a magnetizer may be reduced. Moreover, with a lesser force, the amount of wear suffered by magnetizer and/or magnet bar components is reduced. Second, a magnetizer cushion may absorb vibrations or may better absorb vibrations, thereby improving the quality of the data gathered by the sensors and improving detection of pipe defects. Third, a magnetizer cushion may better absorb forces from high-impact events, preventing damage to the magnetizers. Fourth, a magnetizer cushion may be able to be swapped with a magnetizer cushion having a different hardness (e.g., a cushion made from a different type of polyurethane or a different thermoset or thermoplastic material), so a user may be able to control the ride height and sag factor, which can better tailor the magnetizer for different pipelines or different environments. Fifth, a magnetizer cushion may provide additional protection for electronic wiring (e.g., from shear forces, twisting, or pressure), which maybe passed through the lower portion of the cushion. Sixth, a magnetizer cushion may simplify the design of the magnetizer component that biases the magnet bar against the pipe wall; specifically, some spring designs are relatively complex, subjecting the springs to maintenance (e.g., replacement, inspection, cleaning). A magnetizer cushion may have an extended life, and may require significantly less cleaning, reducing maintenance burdens and reducing the risk of component failure. Seventh, spring designs (specifically in larger tools) can be costly; a magnetizer cushion may cost a fraction of a relatively more complicated spring. Incorporating a magnetizer cushion, therefore, may reduce manufacturing costs and may reduce the cost of ownership long term. Eighth, many spring designs have complex shapes, and debris may build up in and around the spring over time, reducing the function of the spring and requiring additional ongoing maintenance. A magnetizer cushion (e.g., a polyurethane cushion) may reduce or eliminate such build up due to its simpler shape and how it takes up space where debris may have previously built up.

In an alternate embodiment, sensor head 703 includes an independent sensor head suspension system. Sensor head suspension system may include one or more conical springs coupling the bottom of the sensor head 703 to the central shaft. In an embodiment, sensor head suspension system comprises dual conical springs. Both means for collapsing 706 and sensor head suspension system may enable components of the circumferential magnetizer to collapse up to 25% of the outside diameter of the pipe; that is, the diameter of at least part of the circumferential magnetizer may be reduced by up to 25% when encountering an aberration in the pipe or when going around a bend in the pipeline. These features may allow a pig to navigate pipeline bends of greater than or equal to 1.5 D (where D is equal to the pipe diameter). In an embodiment, these features may allow a pig to navigate pair of 1.5 D bends separated by a pipeline distance equal to 3D. The collapsibility features may reduce drag force on the circumferential magnetizer, which may help to prevent a pig from stalling when navigating a relatively tight bend.

Figure 7:
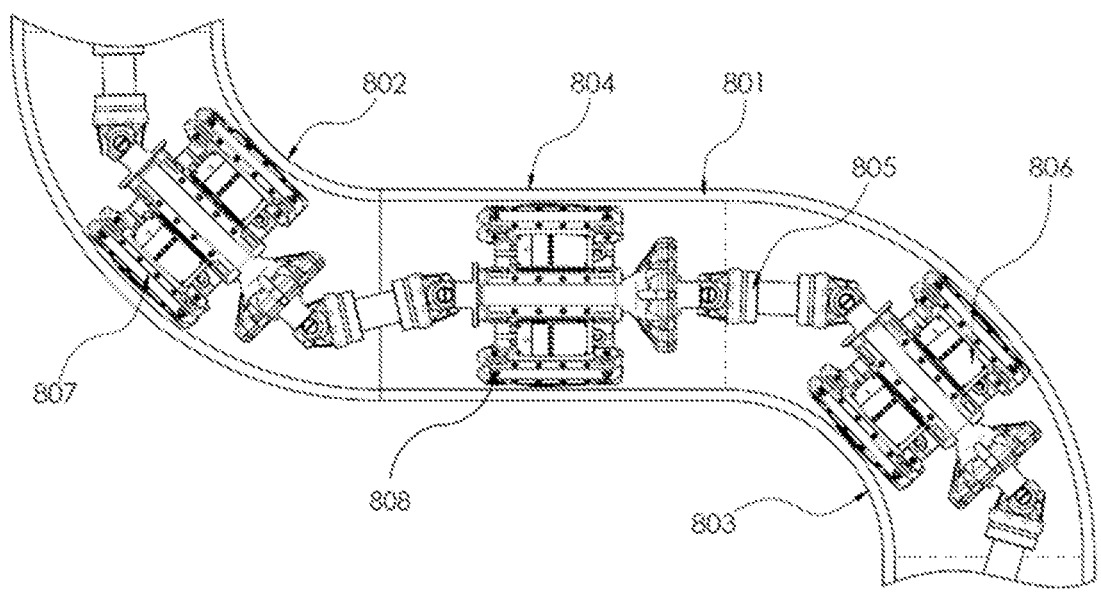
FIG. 7 shows a plurality of circumferential magnetizers according to an embodiment of the present disclosure operatively linked together and navigating bends in a pipeline.

FIG. 7 shows a plurality of circumferential magnetizers according to an embodiment of the present disclosure operatively linked together navigating bends in a pipeline. A plurality of circumferential magnetizers 804 may be operatively linked together by linking means 805. Linking means 805 may be able to rotate about the center shaft and may include features allowing for some transverse rotation about a bolt incorporated in the linking means. These features of linking means 805 can be seen with reference to FIG. 7. Linking means may be particularly susceptible to damage caused by dramatically increased forces when a stalled pig is suddenly propelled out of a stall-causing feature of a pipeline. Each circumferential magnetizer 804 may include a plurality of magnet bars 807. Each magnet bar 807 may include magnetic circuit poles and one or more sensor head(s) 806 including a plurality of sensors. One or more magnet bars may include one or more rotational elements 808. Rotational elements 808 may help prevent circumferential magnetizers 804 from becoming stuck in a pipeline bend by reducing frictional forces experienced by circumferential magnetizers 804 and thus ensuring a steadier, more consistent velocity. In an embodiment, rotational elements 808 may decrease the experienced frictional forces by about 4.5 times compared to a magnetizer without rotational elements 808. A pig including circumferential magnetizers 804 may be capable of navigating complex bends in a pipeline 801. For example, each bend 802, 803 may have a bend configuration of greater than or equal to about 1.5 D. In an embodiment, each bend 802, 803 may have a bend configuration with a pair of 1.5 D bends separated from each other by a pipeline distance equal to 3D. Circumferential magnetizers 804 may have a diameter of about six inches. If pipeline 801 has a nominal diameter of six inches, there may be a distance of about 18 inches between the bends 802, 803. Generally speaking, circumferential magnetizers 804 according to at least one embodiment of the present disclosure may be capable of navigating two bends 802, 803, where one magnetizer 804 simultaneously navigates each bend, if each bend is separated by a distance of about three times the nominal diameter of the pipe. A number of features may contribute to the ability of a pig including three circumferential magnetizers to navigate such complex bends without stalling, including but not limited to the means for collapsing the magnet bar (or a torsion spring or magnetizer cushion), which may provide the circumferential magnetizers with a collapsibility of about 25%; the length of the magnet bars and the center shaft; the one or more rotational elements 808; and the design of the universal joints, which provide connections among the various modules comprising the smart pig. These features may be seen with reference to FIG. 7.

A smart pig may be propelled through a pipe while product is moving through the pipe. The moving product may exert a pressure on an aft end of a smart pig, or on the aft end of one or more modules comprising a smart pig, which may propel the pig through the pipe. The speed at which a pig and its constituent modules travels is accordingly a result of the differential pressure at an aft end of the pig compared to the forward end of the pig. To take consistent measurements, it is desirable to maintain the differential pressure as close to constant as possible to keep the speed of the pig as close to constant as possible. When encountering a bend in a pipeline, conventional pigs tend to experience increased drag force that slows down and often stalls the pig in the pipeline. When a pig stalls, the differential pressure at the aft end of the pig builds until the pig is shot free. However, a pig that is shot in such a manner may be travelling too fast to take reliable measurements. This speed may also increase the risk of damage. The rotational elements of the present disclosure may help to reduce the drag force experienced in a bend, allowing the circumferential magnetizer modules to maintain a constant speed through a bend, which may further enable more accurate measurements to be taken throughout the pipeline, particularly in areas right after a bend. In an embodiment, a smart pig including three circumferential magnetizers may be able to navigate a pair of 1.5 D bends separated from each other by a pipeline distance equal to 3D.

Figure 8:
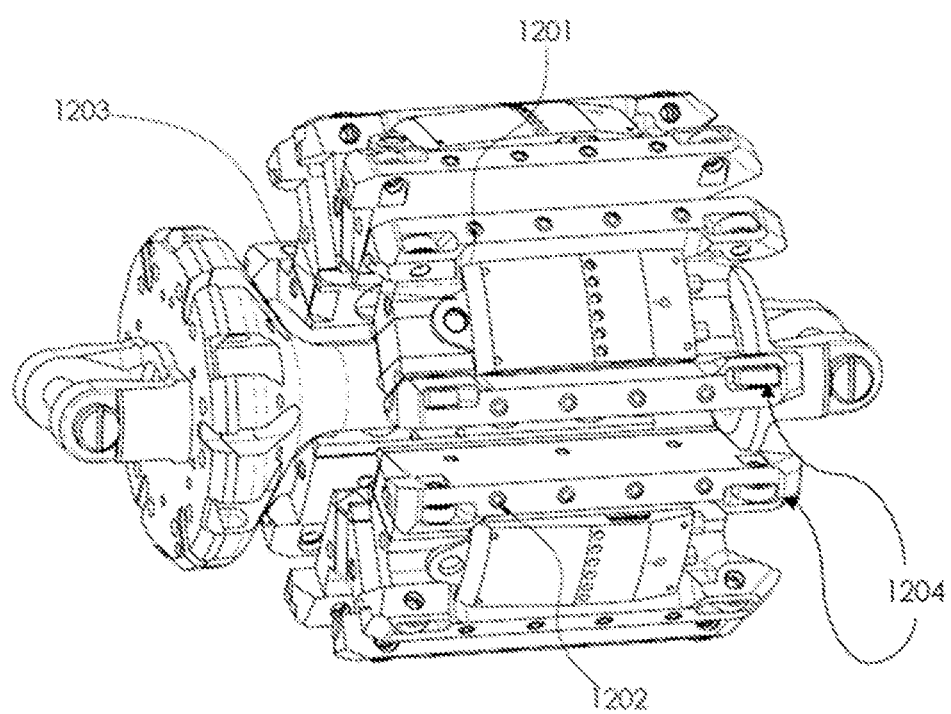
FIG. 8 presents a side perspective view of a circumferential magnetizer according to an embodiment of the present disclosure.

FIG. 8 illustrates a side view of circumferential magnetizer module. The circumferential magnetizer according to the embodiment of FIG. 12 includes magnetic circuit poles 1201. Magnetic circuit poles 1201 may be curved and thickened at their forward and aft ends. Magnetic circuit poles 1201 may include wear pads 1202. The curvature and end thickening, which is visible in FIG. 12, may help to concentrate the magnetic flux and create greater magnetic uniformity across sensor head 1203. Sensor head 1203 may include a wear plate and may include a single attachment point. The single attachment point may facilitate both radial movement and internal surface curvature tracking. The magnetizer may include one or more wheels 1204 disposed partially within the magnetizer to reduce drag forces experienced by the magnetizer. In one aspect of the disclosure, wheels 1204 extend about 2 millimeters from a radially outward surface of magnetic circuit poles 1201.

An axial magnetizer in accordance with the present disclosure may include several components, including magnet systems, sensor systems, sensor suspension systems, magnet bar wear pads, rotational elements 1607, and other related components. An axial magnetizer in accordance with the present disclosure may include one or more magnets oriented and configured to induce a magnetic field coaxially with the axis of the pipeline. In an embodiment, an axial magnetizer may include a plurality of magnets of a first polarity disposed circumferentially around a front end of a central shaft as well as a plurality of magnets of the opposite polarity disposed circumferentially around a rear end of the central shaft. In an embodiment, sensors may be disposed between the magnets having opposite polarities.

Figure 9:
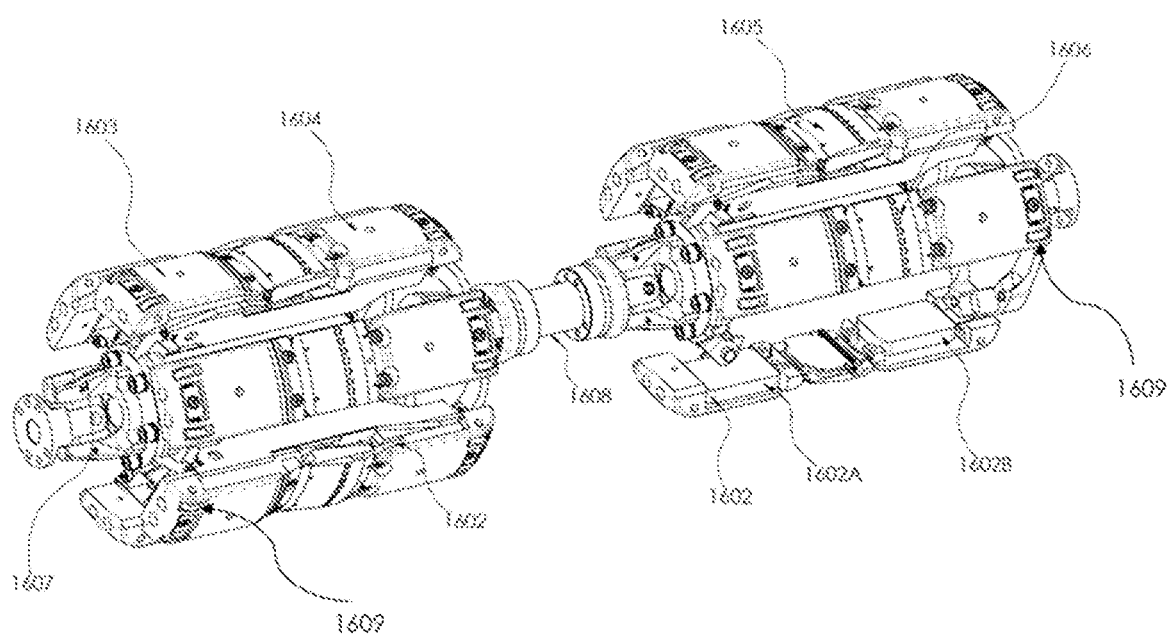
FIG. 9 shows exemplary axial magnetizer modules coupled together in accordance with an embodiment of the present disclosure.

With reference to FIG. 9, which shows two axial magnetizers 1601 coupled together, an axial magnetizer may include a plurality of magnets 1602, which may be coupled to the pipe wall with magnetic circuit poles 1603, 1604. The magnets 1602, together with the magnetic circuit poles 1603, 1604, may form magnet bars. The magnet bars may be spaced evenly apart from each other and may extend radially outward from the central shaft, the central shaft being coaxial with the length of the pipeline. For example, an axial magnetizer may include two or more magnet bars. In an embodiment, an axial magnetizer may include six magnet bars. Each magnet bar may have a pair of magnetic circuit poles 1603, 1604 with sensors 1606 disposed between the magnetic circuit poles 1603, 1604. A sensor head 1605 may include a plurality of sensors 1606. Each magnet bar may include a magnet 1602A disposed toward the front end of the magnet bar having a first polarity and a magnet 1602B disposed toward the rear end of the magnet bar having the opposite polarity. A front magnetic circuit pole 1603 may contact the first pole of the front magnet 1602A and extend from the magnet 1602A radially outward toward a pipe wall. A rear magnetic circuit pole 1604 may contact the opposite pole (i.e., the opposite pole of the front magnet) of the rear magnet 1602B and extend from the magnet 1602B radially outward toward the pipe wall. A sensor head 1605 may be disposed between these magnetic circuit poles. In this manner, a magnetic field may flow between the magnetic circuit poles and across the sensor head 1605 disposed between the magnet bars. When the magnetic circuit poles contact the pipe wall, a magnetic circuit may be created, and the sensors 1606 on the sensor head 1605 may monitor the magnetic flux and detect any magnetic flux leakage from the pipe wall. Positioning magnets 1602 and magnetic circuit poles 1603, 1604 in this manner allows a magnetizer to impart a magnetic field in an axial direction with respect to the axis of the pipeline. This orientation may allow for circumferentially oriented defects, such as a metal loss or corrosion at girth welds, loci of damage, some forms of circumferential cracking, or other defects extending circumferentially around a portion of the pipeline to be detected.

Magnetizers 1601 may include one or more rotational elements 1609 disposed on, in, or partially within the magnetizer 1601 and, in an example on, in, or partially within one or more magnet bars. In one example, rotational elements 1609 are disposed partially within magnetic circuit poles 1603, 1604 and may extend slightly beyond the radially outward surface of magnetic circuit poles 1603, 1604 by, for example, about 2 millimeters.

The magnets 1602 in an axial magnetizer may be permanent magnets or electromagnetic magnets. In an embodiment, the magnets may be rare-earth permanent magnets. In an embodiment, the magnets may be neodymium-based magnets.

Axial magnetizers may be connected to each other with universal joints, which connected to the central shaft by linkage components 1607. The universal joints 1608 may be angle controlled. The axial magnetizers may be oriented relative to each other to ensure complete coverage of the inside of a pipe. Universal joints 1608 may maintain the orientations of the circumferential magnetizers with respect to each other. The central shaft, linkage components 1607 and universal joints may comprise titanium to maintain strength, provide corrosion resistance, and reduce weight. In an embodiment, the central shaft, linkage components 1607, and universal joints 1608 may be comprised entirely of titanium.

Figure 10:
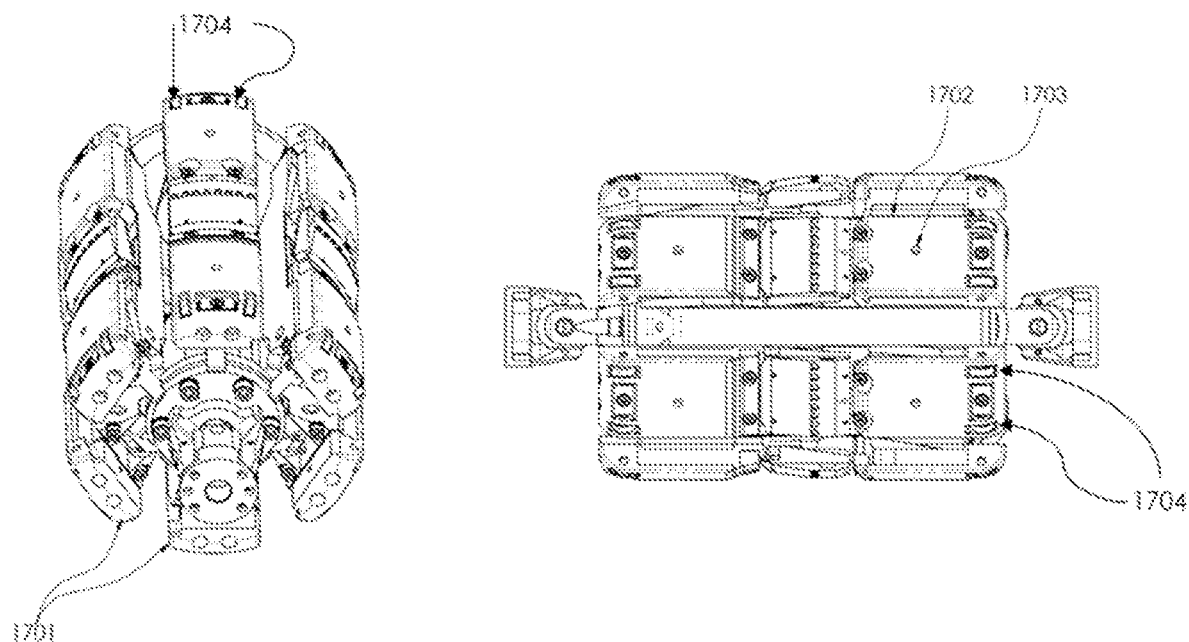
FIG. 10 shows front and side views of an exemplary axial magnetizer in accordance with an embodiment of the present disclosure.

With reference to FIG. 10, each axial magnetizer may include six magnet bars 1701. Each magnet bar may be designed to cover about 30 degrees of the pipe circumference, such that when each axial magnetizer has six magnet bars, coupling two axial magnetizers to each other may cover about 360 degrees of the pipe circumference. Each magnetic circuit pole may include one or more wear pads 1702. A magnetic circuit pole wear pad 1702 may protect a magnetic circuit pole from the interior surface of the pipeline or debris within the pipeline interior. This may extend the amount of usable time between repairs. In an embodiment, a magnetic circuit pole wear pad 1702 may comprise one or more inserts 1703. In a detailed embodiment, the magnetic circuit pole wear pad 1702 may comprise a plurality of carbide or ceramic inserts 1703. In an embodiment, one or more magnetic circuit poles may include one or more carbide or ceramic inserts 1703 disposed directly into the magnetic circuit pole(s). Carbide or ceramic inserts 1703 may provide beneficial reductions in drag force. Carbide or ceramic inserts 1703 may reduce drag force by as much as 30% from conventional designs. Each magnetic circuit pole wear pad 1702, if included, may be maintained at an angle with respect to the axis of the pipeline. A magnet bar wear pad, in an embodiment, may be arranged and designed to facilitate slow counter-clockwise rotation of a magnetizer or pig. Alternatively or in addition, the carbide or ceramic inserts 1703, if included, may be disposed in a pattern designed to facilitate a slow rotation of the pig. One or more rotational elements 1704, which may be wheels 1704, may be disposed at least partially within the one magnet bars. Magnet bars 1701 may include one or more rotational elements 1704 disposed on, in, or partially within the magnet bars 1701 and, in an example on, in, or partially within one or more magnet bars. In one example, rotational elements 1704 are disposed partially within magnetic circuit poles of magnet bars 1701 and may extend slightly beyond the radially outward surface of magnetic circuit poles by, for example, about 2 millimeters.

The configuration of rotational elements 1704, such as wheels 1704, may contribute to a controlled motion of magnetizer or pig. one or more magnet bars may include one or more rotational elements disposed on, in, or partially within the magnet bar(s), which may have the effect of reducing drag forces or frictional forces experienced by a magnetizer or pigging tool during transit through a pipeline. In an example, the rotational elements 1704 are a combination of wheels and ball bearings. Where the one or more rotational elements 1704 comprise wheels 1704, the wheels 1704 may be offset from an orientation perpendicular from the axis of a pipeline. Where an offset is included, the offset may be between about 0.4 degrees to about 8 degrees. On most tools, it may be preferable for wheels 1704 to have an offset of less than about 5 degrees so as to not over-rotate the magnetizer and/or pigging tool. Larger diameter tools may be able to be configured such that the rotational elements 1704 have an offset greater than 5 degrees. In one aspect, the one or more wheels 1704 may be offset by about 1 degrees to about 4 degrees. In another aspect, the one or more wheels 1704 may be offset by about 1.5 degrees to about 3 degrees. In another aspect, the one or more rotational elements 1704 may be offset by about 2 degrees. In one aspect according to the present disclosure, a 2 degree offset may impart about 360 degrees of rotation about every 100 to 200 meters. In an aspect, a degree of offset may be identified and chosen to impart about 360 degrees of rotation every 100 to 200 meters.

One or more sensor heads may be placed in each magnet bar. The one or more sensor heads may be disposed between magnetic circuit poles and may therefore be positioned to measure magnetic flux through a pipe wall. Each sensor head may include one or more sensors. The magnets may saturate a portion of pipeline to be inspected with an axial magnetic flux. The sensors may measure the magnetic flux and, in particular, may detect changes or aberrations in the magnetic flux. Defects in the pipeline, including corroded areas, areas missing metal, geometric deformations, dents, buckles, wrinkles, cracks, and the like may induce aberrations and changes into the magnetic flux, or the magnetic flux may leak at the particular location of a defect.

The axial magnetizers may travel through a pipe having an internal diameter less than the nominal diameter of the magnetizer and may be configured to closely articulate with the pipe wall. A pipe may have some structural aberration, such as a crack or crack-like anomaly. An axial magnetizer may be particularly adept at detecting circumferentially oriented aberrations or defects. The magnetic field from the magnets may be imparted to the pipe wall by front magnetic circuit pole and rear magnetic circuit pole (each having opposite polarities) to saturate the pipe wall with magnetic flux. Sensors may be placed between magnets to be within the magnetic field. The magnetic field may be disrupted when the axial magnetizers pass over aberrations or flaws, and the disruption in the magnetic flux may be detected by the sensors.

In an embodiment, a magnet bar may include a plurality of sensors between each magnetic circuit pole to measure the magnetic flux imparted into the pipe. The magnetic circuit poles may impart a magnetic flux into a pipe wall, and the magnetic flux may flow from one magnetic circuit pole to the other. Sensors positioned within the magnetic field may measure the magnetic flux. In an embodiment, sensors may be spaced at approximately 0.080 inches (2.0 mm). In an embodiment, sensors may comprise Hall-effect sensors. In an embodiment, an axial magnetizer may include six magnet bars and may have 40 Hall sensors per diameter-inch. Aberrations in the pipe may cause distortions or disruptions in the magnetic field, and the sensors may thus detect the irregularities in the magnetic field corresponding to the aberration in the pipe. A magnetizer utilizing an axially oriented magnetic field may be able to detect circumferential flaws of 0.8 inches (20 mm) with an opening of 0.004" (0.1 mm). A sensor head may be able to survive forces of up to about 20G, and sensors may be able to withstand pressures of up to 2,000 psi (13.8 Mpa) and velocities of up to 30 ft/s (9 m/s).

An axial magnetizer may be sized to have a nominal diameter slightly larger than the diameter of a pipe. For example, an axial magnetizer slightly larger than six inches in diameter may be configured to travel through a six-inch pipe. One of skill in the art will recognize that an axial magnetizer according to the present disclosure may be sized to inspect pipes of alternating diameters. An axial magnetizer may include compression features allowing the magnetizer to fit inside and travel within the pipe.

With reference back to FIG. 9, magnetic circuit poles 1603, 1604 may contact or be disposed in close proximity to the interior of the pipeline. In an embodiment, magnetic circuit poles 1603, 1604 may function as a flux coupler to more efficiently saturate a pipe wall with a magnetic field. In a detailed embodiment, magnetic circuit poles 1603, 1604 may include wear pads 1702 on at least a portion of a surface that contacts the pipe wall. Wear pads 1702 may comprise one or more ceramic or carbide inserts 1703, as depicted in FIG. 10. In an embodiment, magnetic circuit poles 1603, 1604 may include rotational elements 1609. Ceramic or carbide inserts 1703 may protect the magnetic circuit poles 1603, 1604 from wear and may reduce drag force. Rotational elements (shown as 1609 in FIGS. 9 and 1704 in FIG. 10) may reduce drag force and/or may contribute to controlled rotation of the magnetizer or pig. In an embodiment, ceramic or carbide inserts 1703 may reduce drag force by about 30%. In an embodiment, rotational elements 1609, 1704 may reduce the drag force experienced by a magnetizer by about 4.5 time compared to a magnetizer without rotational elements 1609, 1704. In an embodiment, rotational elements 1609, 1704 may make contact with the pipe and be disposed (or partially disposed) about 2 mm beyond the outer surface of the magnetic circuit poles 1603, 1604 and may reduce the drag forces experienced by the magnetizer by about 4.5 times compared with a magnetizer not including rotational elements 1609, 1704. Rotational elements 1609, 1704 may prevent a magnetizer from becoming stalled in transit or reduce the number and severity of such occurrences.

Sensor head wear pad 1702 may comprise a nickel-based alloy or superalloy. Magnetic circuit poles 1603, 1604 may include a ceramic insert 1703 or coating. In detailed embodiments, the ceramic may comprise silicon carbide. In alternate detailed embodiments, the inserts may comprise tungsten carbide. Other varieties will be apparent to those skilled in the art.

Figure 11:
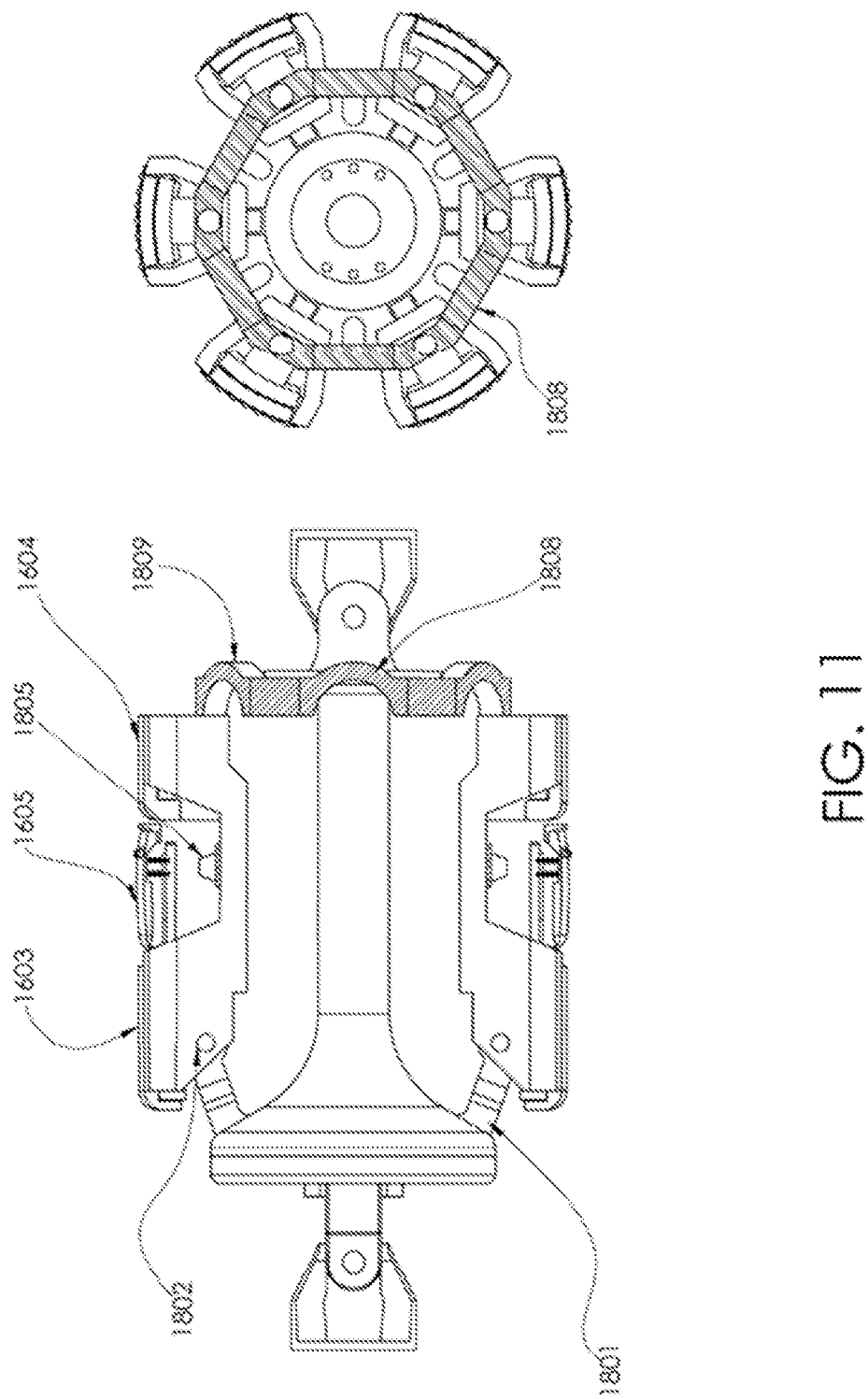
FIG. 11 a cross-section of a side view of an axial magnetizer in accordance with an embodiment of the present disclosure.

The axial magnetizer according to the embodiment depicted in FIG. 11 may include a means for collapsing the magnet bars. Means for collapsing may comprise front links 1801 and torsion spring 1802. Torsion spring 1802 may exert a sufficient force, such as a spring force, to maintain the magnetic circuit poles 1603, 1604 in engagement with the pipe wall but may collapse, entirely or partially, if the magnetic circuit poles 1603, 1604 encounter an aberration in the pipe, such as an indentation, or if the pig including the axial magnetizer encounters a bend in the pipe. In an embodiment, sensor head 1605 is also operatively coupled to the means for collapsing by virtue of it being part of the magnet bar.

In an alternate embodiment, sensor head 1605 includes an independent sensor head suspension system. Sensor head suspension system may include one or more conical springs 1805 coupling the bottom of the sensor head 1605 to the magnet bar. In an embodiment, sensor head suspension system comprises dual conical springs 1805. Both means for collapsing (and/or the magnetizer cushion) and sensor head suspension system may enable components of the axial magnetizer to collapse up to 25% of the outside diameter of the pipe; that is, the diameter of at least part of the axial magnetizer may be reduced by up to 25% when encountering an aberration in the pipe or when going around a bend in the pipeline. These features may allow a pig to navigate pipeline bends of greater than or equal to 1.5 D (where D is equal to the pipe diameter). In an embodiment, these features may allow a pig to navigate pipeline bends with a minimum separation of 2D (i.e., two pipe diameters separation). In another embodiment, the features may allow a pig to navigate a pair of 1.5 D bends separated from each other by a pipeline distance equal to 3D. The collapsibility features may reduce drag force on the axial magnetizer, which may help to prevent a pig from stalling when navigating a relatively tight bend. In an alternate or additional embodiment, a magnet bar may include one or more wheels disposed at least partially within the magnet bar.

In an embodiment, each magnet bar may include rear links similar to links 1801 to join the rear end of each magnet bar to the central shaft, along with a torsion spring or a magnetizer cushion. Such an embodiment may maintain the entire magnet bar in contact with the pipe wall. Alternatively, each magnet bar of an axial magnetizer may include a front control link 1801 and a torsion spring 1802 or a magnetizer cushion. Torsion spring 1802 or the magnetizer cushion may support the weight of each magnet bar and may help to support the weight of the central shaft. The rear portion of the axial magnetizer may include a polyurethane ring 1808. Polyurethane ring 1808 may help to maintain each magnet bar biased against the pipe wall but may also help to balance forces, especially when encountering aberrations in the pipeline or when navigating bends. Polyurethane ring 1808 may include bends 1809, which may allow polyurethane ring 1808 to temporarily collapse and allow the magnet bar(s) to collapse toward the center shaft. Ring 1808 may be made from polyurethane for durability and chemical resistance concerns; however, one of skill in the art may recognize alternative materials from which ring 1808 may be constructed, such as silicone or a durable, chemical-resistant thermoplastic.

Figure 12:
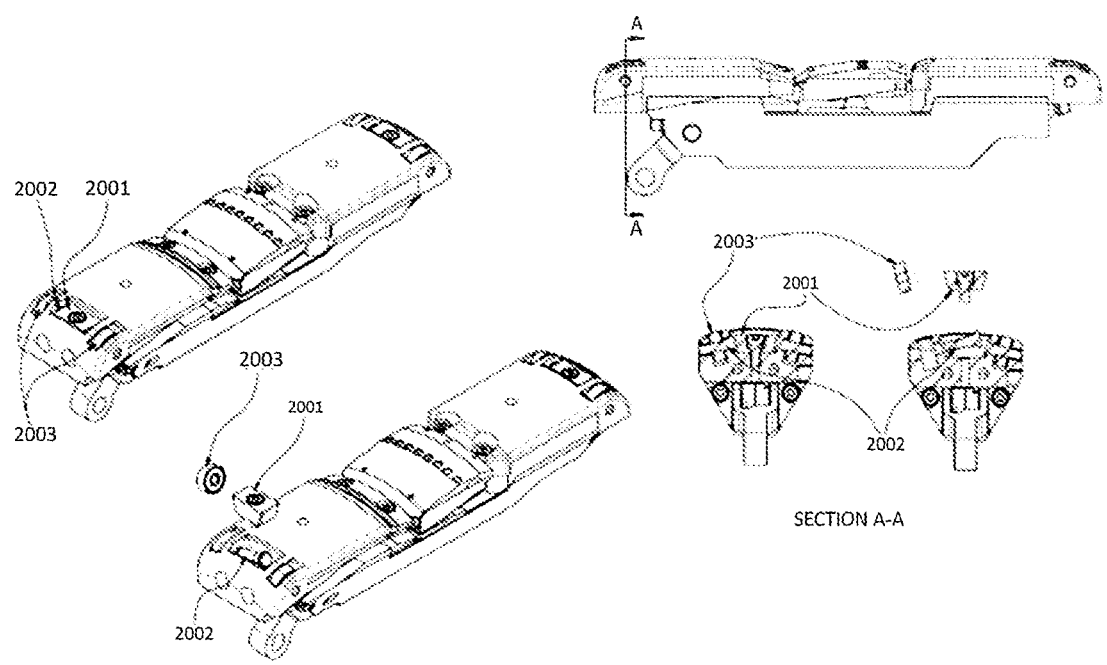
FIG. 12 illustrates the ease of replacement of rotational elements according to one aspect of the present disclosure.

In an embodiment, rotational elements 2003 are configured to be easily accessed and replaced. Rotational elements 2003 may be replaced on-site (e.g., at a pipeline site) by a field technician in a matter of minutes. FIG. 12 illustrates an example configuration of rotational elements 2003, and the configuration of rotational elements 2003 on a magnet bar. Rotational elements 2003 may be disposed on an axle 2002. Magnet bars may include a cover 2001 sized and shaped to retain axle 2002. Magnet bars may include an inset configured to retain most of rotational elements 2003 such that only a small portion of rotational elements 2003 (e.g., about 2 millimeters) extends past a radially outward surface of magnet bars. Axle 2002 may be similarly disposed within an inset portion of the magnet bar. Cover 2001 may include a screw, quick-lock element, or other securing means for retaining cover 2001 securely in the magnet bar. Cover 2001 may retain axle 2002 securely in place. Cover 2001 and axle 2002, when cover 2001 is secured, may retain rotational elements 2003 securely in place. When replacing rotational elements 2003, securing means may be loosened, and cover 2001 may be removed. Axle 2002 may then be accessed. Rotational elements 2003 may slide off of axle 2002, and new rotational elements 2003 may be installed (e.g., slid onto) axle 2002. In an embodiment, axle 2002 may be configured to angle radially outward to assist with accessing rotational elements 2003 for replacement. After replacement, cover 2001 may be placed back into its insert in the magnet bar, and securing means tightened to retain cover 2001 securely in place.

A component, process, or alteration that could reduce the drag or friction forces experienced by a pigging tool could also significantly reduce the wear experienced by pipeline-contacting components (or pipeline-adjacent components) of a pigging tool, such as magnet bars (or "mag bars") on MFL modules, or wear pads (such as carbide, ceramic, composite, or other types of wear pads) that may be installed on the pigging tool.

In aspects according to the present disclosure, a magnetizer module incorporates one or more rotational elements on or in (or partially within) the magnetizer module. In one embodiment, the one or more rotational elements comprise one or more wheels. In an embodiment, the one or more wheels can be circular or cylindrical. In one embodiment, the one or more wheels have a circular cross-section. In an embodiment, the one or more rotational elements may be retained on one or more axles (or shafts comprising bearings allowing for rotation). In an embodiment, the one or more rotational elements comprise one or more spherical balls retained in a bearing.

It would be further beneficial that a component, process, or alteration to a pigging tool be easy to repair or replace when it becomes worn out, including in the field by a technician, preferably in a matter of a few minutes, so as not to impede pipeline inspection operations. In an embodiment comprising one or more rotational elements on, in, or partially within a magnetizer module or a mag bar thereof, it would be beneficial for such rotational elements to be easily and quickly accessible, detachable, cleanable, and/or replaceable in the field.

It would also be beneficial for a component, process, or alteration to a pigging tool to impart a slight amount of rotation to a pigging tool or module thereof. In an embodiment where a magnetizer module or a mag bar comprises one or more rotational elements, such as one or more wheels, it would be beneficial to configure said rotational elements to have a small amount of offset relative to the axis of the pipeline (e.g., so that the axis of rotation of said rotational elements is offset slightly from perpendicular to the axis of the pipeline). In one aspect, the one or more rotational elements may be offset approximately 0.4 degrees to about 8 degrees. In a preferred embodiment, the one or more rotational elements may be offset but by less than about 5 degrees. In one aspect, the one or more rotational elements may be offset by about 1 degrees to about 4 degrees. In another aspect, the one or more rotational elements may be offset by about 1.5 degrees to about 3 degrees. In a preferred aspect, the one or more rotational elements may be offset by about 2 degrees. In smaller tools (such as pigs less than six inches in diameter), the one or more rotational elements may not be offset at all. In larger diameter tools, which generally are heavier, a relatively larger amount of offset in the one or more rotational elements may be preferred compared to smaller diameter tools to maintain a relatively constant degree of rotation. In one aspect according to the present disclosure, a 2 degree offset may impart about 360 degrees of rotation about every 100 to 200 meters. In an aspect, a degree of offset may be identified and chosen to impart about 360 degrees of rotation every 100 to 200 meters.

In an embodiment where a magnetizer module or a mag bar comprises one or more rotational elements, such as one or more wheels, the one or more rotational elements may be offset from perpendicular to the axis of the pipeline in a counterclockwise direction. In an embodiment, one or more rotational elements may be configured to have an offset large enough to impart a consistent rotation to the magnetizer module or smart pig but not so large as to cause the magnetizer module or smart pig to rotate too quickly and jeopardize complete coverage of a pipeline wall, such as through the corkscrew effect.

In one aspect according to the present disclosure, a slight, imparted rotation to a pigging tool may ensure an even rate of wear on all like components making contact with, or positioned adjacent to, the pipeline wall.

In one aspect according to the present disclosure, a slight, imparted rotation to a pigging tool may add precision to an inertial navigation device. Inertial navigation devices may include one or more accelerometers and one or more gyroscopic sensors. Accelerometers may deliver data regarding speed and direction of acceleration by, for example, measuring linear acceleration of the device relative to itself. Gyroscopic sensors may provide or measure orientation and may measure angular velocity. Measuring angular velocity with linear acceleration may provide accurate information for all position changes of the moving inertial navigation device. Assuring a slight rotation may increase the accuracy of gyroscopic sensors.

In one aspect according to the present disclosure, a slight, imparted rotation to a pigging tool may ensure more precise sensor scanning of the pipeline wall, including long seams and other flaws. As one example, a slight, imparted rotation may allow for a smoother profile of very small features (including axial flaws like cracking, pin holes, narrow axial corrosion, and selective seam weld corrosion). Rotation allows multiple sensors to pass across features, particularly axial features, as opposed to merely one or a couple of sensors passing over a flaw.

It one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In turn, a reduction in drag or friction forces experienced by the tool may lower the differential pressure required to propel the pigging tool through the pipeline. A pigging tool that is propelled through a pipeline with a lower differential pressure means that the drive cups handle a reduced load. A reduced load on the drive cups may reduce the wear on the drive cups and may thereby extend the life of the drive cups.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In turn, lower forces may act on the linkages between modules of the pigging tool, which may reduce the risk of linkage fatigue and failure, thereby increasing safety and extending the life of pigging tools. Reduced drag or friction forces may result in a pigging tool becoming stuck less frequently and, if it occurs, less severely. In other words, a stuck tool may be freed with less pressure buildup behind the tool. In turn, sudden and severe velocity increases and attendant strain on linkage components can be dramatically reduced.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In an embodiment, a pigging tool incorporating such elements may more easily be able to pass pipeline aberrations, damaged areas, or bends, which may mean that the pigging tool does not become stuck or temporarily stopped, which means that there will be less frequent sudden increases in velocity from a pressure differential building and causing the tool to suddenly become freed. This may lead to a lessened risk of pigging tool damage and pipeline damage.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In an embodiment, a pigging tool incorporating such elements may collect improved data quality and fidelity and lower data degradation due to a smoother and more controlled velocity.

In one aspect according to the present disclosure, a component, process, or alteration to a pigging tool may decrease the friction or drag force imparted on a pigging tool. In an embodiment where a magnetizer module or a mag bar comprises one or more rotational elements, such as one or more wheels, the one or more rotational elements may reduce the drag force or friction force experienced by the tool. In one embodiment, including one or more rotational elements on one or more magnetizer modules may enable about a 4.5 times reduction in drag force.

In an embodiment where a magnetizer module or a mag bar comprises one or more rotational elements, such as one or more wheels, a mag bar may contain between two rotational elements and eight rotational elements. In an embodiment, a mag bar may contain four rotational elements.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A circumferential magnetizer module for a smart pig, comprising:
    a central shaft; and
    at least one magnet bar, adjustably coupled to the central shaft, the magnet bar configured to induce a steady magnetic field transverse to a longitudinal axis of the central shaft to a pipe wall, the at least one magnet bar comprising:
    at least one magnet comprising a north pole side and a south pole side;
    a north magnetic circuit pole coupled to the north pole side of the at least one magnet and extending radially away from the central shaft;
    a south magnetic circuit pole coupled to the south pole side of the at least one magnet and extending radially away from the central shaft;
    a sensor head to monitor magnetic flux comprising at least one sensor disposed between the north magnetic circuit pole and the south magnetic circuit pole;
    at least one insert disposed within each of the north magnetic circuit pole and the south magnetic circuit pole; and
    a rotational element disposed within each of the at least one inserts;
    wherein each of the rotational elements is configured to extend radially outward from an outer surface of its respective magnetic circuit pole.

2. The circumferential magnetizer module of claim 1, wherein the at least one magnet bar is coupled to the central shaft at at least one axial end by a set of links, a hinge, and one of a torsion spring or a magnetizer cushion.

3. The circumferential magnetizer module of claim 2, wherein the one of the torsion spring or the magnetizer cushion is configured to allow the at least one magnet bar to move radially inward toward the central shaft.

4. The circumferential magnetizer module of claim 1, wherein the circumferential magnetizer module has a diameter about 25% smaller when fully compressed.

5. The circumferential magnetizer module of claim 1, wherein the at least one magnet bar comprises six magnet bars.

6. The circumferential magnetizer module of claim 1, wherein the north magnetic circuit pole and the south magnetic circuit pole include a plurality of wear pads.

7. The circumferential magnetizer module of claim 6, wherein the wear pads are ceramic or tungsten carbide inserts.

8. The circumferential magnetizer module of claim 1, wherein each of the rotational elements extends about 2 millimeters radially outward from the outer surface of its respective magnetic circuit pole.

9. The circumferential magnetizer module of claim 1, wherein each of the rotational elements is offset relative to an axis of the central shaft such that an axis of rotation of the rotational elements is offset from perpendicular to the axis of the central shaft, wherein the degree of offset is between about 0.4 degrees to about 5 degrees.

10. The circumferential magnetizer module of claim 8, wherein each of the rotational elements is offset relative to an axis of the central shaft such that an axis of rotation of the rotational elements is offset from perpendicular to the axis of the central shaft, wherein the degree of offset is between about 0.4 degrees to about 5 degrees.

11. The circumferential magnetizer module of claim 9, wherein the degree of offset is about 2 degrees.

12. The circumferential magnetizer module of claim 10, wherein the degree of offset is about 2 degrees.

13. The circumferential magnetizer module of claim 1, wherein the sensor head further comprises a suspension system comprising at least one conical spring to position the sensor head during operation.

14. The circumferential magnetizer module of claim 1, wherein each of the rotational elements is a wheel.

15. An axial magnetizer module for a smart pig, comprising:
    a central shaft; and
    at least one magnet bar, adjustably coupled to the central shaft, the magnet bar configured to induce a steady magnetic field coaxially to a longitudinal axis of the central shaft, the at least one magnet bar comprising:
    a first magnet of a first polarity circumferentially disposed around a front end of the central shaft;
    a second magnet of a second polarity circumferentially disposed around a rear end of the central shaft;
    a front magnetic circuit pole coupled to the first magnet and extending radially outward from the central shaft;
    a rear magnetic circuit pole coupled to the second magnet and extending radially outward from the central shaft;
    a sensor head to monitor magnetic flux comprising at least one sensor disposed between the front magnetic circuit pole and rear magnetic circuit pole;
    at least one insert disposed within each of the front magnetic circuit pole and the rear magnetic circuit pole; and
    a rotational element disposed within each of the at least one inserts;
    wherein each of the rotational elements is configured to extend radially outward from an outer surface of its respective magnetic circuit pole.

16. The axial magnetizer module of claim 15, wherein the at least one magnet bar is coupled to the central shaft at at least one axial end by a set of links, a hinge, and one of a torsion spring or a magnetizer cushion.

17. The axial magnetizer module of claim 16, wherein the one of the torsion spring or the magnetizer cushion is configured to allow the magnet bar to move radially inward toward the central shaft.

18. The axial magnetizer module of claim 16, wherein the one of the torsion spring or the magnetizer cushion is configured to allow the at least one magnet bar to move radially inward toward the central shaft.

19. The axial magnetizer module of claim 15, wherein the first magnet and the second magnet are rare-earth permanent magnets, electromagnets, or neodymium-based magnets.

20. The axial magnetizer module of claim 15, wherein the at least one magnet bar comprises six magnet bars and further comprising forty Hall-effect sensors disposed on the sensor head of each of the six magnet bars.

21. The axial magnetizer module of claim 15, wherein the front magnetic circuit pole and the rear magnetic circuit pole include a plurality of wear pads.

22. The axial magnetizer module of claim 21, wherein the wear pads are ceramic or tungsten carbide inserts.

23. The axial magnetizer module of claim 15, wherein each of the rotational elements extends about 2 millimeters radially outward from the outer surface of its respective magnetic circuit pole.

24. The axial magnetizer module of claim 15, wherein each of the rotational elements is offset relative to an axis of the central shaft such that an axis of rotation of the rotational elements is offset from perpendicular to the axis of the central shaft, wherein the degree of offset is between about 0.4 degrees to about 5 degrees.

25. The axial magnetizer module of claim 23, wherein each of the rotational elements is offset relative to an axis of the central shaft such that an axis of rotation of the rotational elements is offset from perpendicular to the axis of the central shaft, wherein the degree of offset is between about 0.4 degrees to about 5 degrees.

26. The axial magnetizer module of claim 24, wherein the degree of offset is about 2 degrees.

27. The axial magnetizer module of claim 25, wherein the degree of offset is about 2 degrees.

28. The axial magnetizer module of claim 15, wherein the sensor head further comprises a suspension system comprising at least one conical spring to position the sensor head during operation.

29. The axial magnetizer module of claim 15, further comprising a magnet shield to focus the induced magnetic field.

30. The axial magnetizer module of claim 15, wherein each of the rotational elements is a wheel.

* * * * *